(12) United States Patent
Safa

(10) Patent No.: US 7,293,266 B2
(45) Date of Patent: Nov. 6, 2007

(54) PLURALITY OF LOADER MODULES WITH A CO-ORDINATOR MODULE WHERE SELECTED LOADER MODULE EXECUTES AND EACH LOADER MODULE EXECUTE

(75) Inventor: John Aram Safa, Nottingham (GB)

(73) Assignee: Simplex Major SDN.BHD, Petaling Jaya, Selangor DE (MY)

( * ) Notice: Subject to any disclaimer, the term of this patent is extended or adjusted under 35 U.S.C. 154(b) by 607 days.

(21) Appl. No.: 10/272,214

(22) Filed: Oct. 15, 2002

(65) Prior Publication Data
US 2003/0093660 A1    May 15, 2003

(30) Foreign Application Priority Data
Oct. 17, 2001   (GB)   .................................. 0124869.9

(51) Int. Cl.
  *G06F 9/44*    (2006.01)
(52) U.S. Cl. .......................... 717/162; 717/166; 713/2; 719/331
(58) Field of Classification Search .................... 713/2, 713/1; 717/168–178, 162–166; 705/1, 54; 719/331–332
See application file for complete search history.

(56) References Cited

U.S. PATENT DOCUMENTS

| | | | | |
|---|---|---|---|---|
| 4,024,504 | A * | 5/1977 | Chowning et al. | 713/2 |
| 5,812,848 | A * | 9/1998 | Cohen | 719/331 |
| 5,933,503 | A * | 8/1999 | Schell et al. | 713/189 |
| 6,006,190 | A * | 12/1999 | Baena-Arnaiz et al. | 705/1 |
| 6,134,324 | A * | 10/2000 | Bohannon et al. | 705/52 |
| 6,141,698 | A * | 10/2000 | Krishnan et al. | 719/331 |
| 6,185,678 | B1 * | 2/2001 | Arbaugh et al. | 713/2 |
| 6,205,580 | B1 * | 3/2001 | Hirose | 717/162 |
| 6,226,747 | B1 * | 5/2001 | Larsson et al. | 713/200 |
| 6,253,258 | B1 * | 6/2001 | Cohen | 719/331 |
| 6,385,567 | B1 * | 5/2002 | Lew et al. | 703/27 |
| 6,405,316 | B1 * | 6/2002 | Krishnan et al. | 713/190 |
| 6,490,722 | B1 * | 12/2002 | Barton et al. | 717/174 |
| 6,532,451 | B1 * | 3/2003 | Schell et al. | 705/54 |
| 6,618,769 | B1 * | 9/2003 | Bracha et al. | 719/332 |

(Continued)

FOREIGN PATENT DOCUMENTS

JP   59231650   12/1984

(Continued)

OTHER PUBLICATIONS

Linkers and Loaders, John R. Levine, Chapters 1,2,3,7 published Oct. 11, 1999.*

(Continued)

*Primary Examiner*—Todd Ingberg
(74) *Attorney, Agent, or Firm*—Smith-Hill and Bedell (57) ABSTRACT

Software loading is effected by means of a header 40 and software modules STUB1, STUB2 etc. The header 40 calls each stub in appropriate order, installing the stub in a loader region 42, executing the stub and then removing it. The STUBS may be encrypted and may be installed at random or pseudo-random locations in the region 42. Generic breaches of security, such as "riding the loader" are prevented because the stubs appear only transiently and at unpredictable positions. Security may be further improved by selecting each stub from a group of alternatives which are differently coded but functionally equivalent.

26 Claims, 5 Drawing Sheets

U.S. PATENT DOCUMENTS

| | | | |
|---|---|---|---|
| 6,618,855 B1* | 9/2003 | Lindholm et al. | 717/126 |
| 6,675,201 B1* | 1/2004 | Parkkinen | 709/216 |
| 6,698,017 B1* | 2/2004 | Adamovits et al. | 717/168 |
| 6,701,334 B1* | 3/2004 | Ye et al. | 707/206 |
| 6,701,433 B1* | 3/2004 | Schell et al. | 713/164 |
| 6,751,735 B1* | 6/2004 | Schell et al. | 713/189 |
| 6,810,519 B1* | 10/2004 | Hicks | 717/166 |
| 6,813,762 B1* | 11/2004 | Plaxton | 717/148 |
| 6,851,111 B2* | 2/2005 | McGuire et al. | 717/166 |
| 6,889,376 B1* | 5/2005 | Barritz et al. | 717/175 |
| 6,915,511 B2* | 7/2005 | Susarla et al. | 717/166 |
| 6,961,852 B2* | 11/2005 | Craft | 713/168 |
| 6,970,960 B1* | 11/2005 | Sarfati | 710/106 |
| 7,028,294 B2* | 4/2006 | Cyran et al. | 717/164 |
| 7,039,923 B2* | 5/2006 | Kumar et al. | 719/331 |
| 7,051,343 B2* | 5/2006 | Bracha et al. | 719/332 |
| 7,069,550 B2* | 6/2006 | Fraenkel et al. | 717/166 |
| 7,082,600 B1* | 7/2006 | Rau et al. | 717/148 |
| 7,099,791 B2* | 8/2006 | Fritzsche | 702/119 |
| 2002/0071559 A1* | 6/2002 | Christensen et al. | 380/278 |

FOREIGN PATENT DOCUMENTS

| | | |
|---|---|---|
| JP | 4215153 | 8/1992 |
| WO | 98/08163 | 2/1998 |
| WO | 02/06951 | 1/2002 |

OTHER PUBLICATIONS

The Design of the Unix Operating System, Maurice J. Bach, 1986, pp. 151-182.*

* cited by examiner

PLURALITY OF LOADER MODULES WITH A CO-ORDINATOR MODULE WHERE SELECTED LOADER MODULE EXECUTES AND EACH LOADER MODULE EXECUTE

CROSS REFERENCE TO RELATED APPLICATION

This application claims priority under 35 USC 119 of United Kingdom Patent Application No. 0124869.9 filed Oct. 17, 2001.

The present invention relates to software loading.

In modern computer systems, application software is usually stored in external memory (such as a hard disk etc.) when not required. The application software will be loaded into the main memory (RAM) when called for execution. The process of loading the software from external memory to the main memory is controlled by a program called a "loader".

In addition to installing the application software, a loader may execute various other operations. Some of these operations may include initialising various data, registers or the like, as required by the application software. Other operations may involve security, such as checking licence details held within the system.

Attempts have previously been made to circumvent these security checks in order to allow unlicensed copies of software to be used. One style of circumventing the security is known as "riding the loader". A piece of software similar to a debugger program is used to allow step-by-step execution of the loader while analysing each instruction in the loader and introducing jump instructions or patches when instructions calling for security checks are detected. Consequently, the loader can be made to complete its execution without making security checks, thus allowing the security to be circumvented.

In accordance with the present invention, there is provided a software loader arrangement operable to load a computer program from external memory to an allocated region of the main memory for execution, the arrangement having a plurality of software modules and including a co-ordinator module which, in use, is loaded at a predetermined position of the allocated region and is operable to co-ordinate execution of the or each other module, and at least one loader module operable to perform at least part of the loading operation, the co-ordinator module being further operable to write the or each loader module from the initial location of the loader module to a temporary location for execution, to initiate execution of the module, and to erase the module from the temporary location after execution.

Preferably, a plurality of loader modules are included, providing respective parts of the loading operation. The plurality of loader modules are preferably written in sequence to a temporary location. Each loader module is preferably selected from a group of modules, the modules of each group including sequences of instructions which are different in each module and which achieve the same result when fully executed.

Preferably, a loader part of the allocated region is designated for loader operations, the or each temporary location being within the said loader part. The or each loader module is preferably initially located outside the said loader part. A program part of the allocated region is preferably designated for the computer program, the or each loader module being initially located after the program part.

The co-ordinator module preferably maintains meaningless data within the loader part, except at the location of a loader module which is being executed. The or each loader module is preferably held initially in encrypted form, the co-ordinator module being operable to decrypt while writing a module to a temporary location.

The co-ordinator module, in use, preferably writes the or each loader module to an address which is selected at the time of writing. Selection of the address is preferably pseudo-random.

The invention also provides computer software which, when installed on a computer system, is operable as a software loader arrangement according to any of the preceding definitions.

The invention also provides a data storage medium containing computer software which, when installed on a computer system, is operable as a software loader arrangement according to any of the definitions set out above.

The invention also provides a computer system incorporating a software loader arrangement according to any of the definitions set out above.

The invention also provides a signal carrying information representing a software loader arrangement according to any of the definitions set out above.

In a second aspect the invention provides a computer program which, in use, is loaded from auxiliary memory to an allocated region of the main memory for execution, the program having associated with it a software loader arrangement according to any of the definitions set out above.

In this aspect, the invention also provides a data storage medium containing a computer program as defined in the previous paragraph.

In this aspect, the invention further provides a computer system incorporating a computer program as defined in the first paragraph relating to this aspect of the invention.

In this aspect, the invention further provides a signal carrying information representing a computer program and a software loader arrangement, as defined in the first paragraph relating to this aspect of the invention.

In a third aspect, the invention provides a suite of software modules comprising at least one co-ordinator module of a software loader arrangement as defined in accordance with the first aspect of the invention, and a plurality of loader modules of the loader arrangement, the loader modules forming groups of modules, the modules of each group including sequences of instructions which are different in each module and which achieve the same result when fully executed, whereby a software loader arrangement may be formed by selecting the or one of the co-ordinator modules and one loader module from the or each group of loader modules.

In this aspect, the invention also provides a data storage medium containing a suite of software modules as defined above.

This aspect of the invention also provides a computer system incorporating a suite of software modules as defined in the first paragraph relating to this aspect of the invention.

This aspect also provides a signal carrying information representing a software loader arrangement which includes the or one of the co-ordinator modules of a suite as defined in the first paragraph relating to this aspect of the invention, and one loader module from the or each group of loader modules of the said suite.

In a fourth aspect, the invention provides a method of loading a computer program from external memory to an allocated region of main memory for execution, in which a co-ordinator module is loaded at a predetermined position in the allocated region and is operable to co-ordinate execution of at least one loader module, the or each loader module being operable to perform at least part of the loading operation, the co-ordinator module writing the or each loader module from the initial location of the loader module to a temporary location for execution, initiating execution of the module, and erasing the module from the temporary location after execution.

A plurality of loader modules are preferably provided to perform respective parts of the loading operation. The co-ordinator module preferably writes the loader modules in sequence to a temporary location.

Preferably the co-ordinator module writes the or each loader module to a temporary location which is within a loader part of the allocated region, designated for loader operations.

The co-ordinator module preferably maintains within the loader part, except at the location of a loader module which is being executed, data which has no functionality in relation to the loading operation. The co-ordinator module may decrypt an encrypted version of the loader module while writing the module to a temporary location.

The co-ordinator module preferably selects an address for the temporary location at the time of writing. Selection of the address is preferably pseudo-random.

In this aspect, the invention also provides a computer system operable to load a computer program in accordance with the method of this aspect of the invention.

In a fifth aspect, the invention provides a method of protecting a computer program during loading of the program from external memory to an allocated region of the main memory of a computer, for execution, in which a co-ordinator software module is loaded at a predetermined position in the allocated region and used to co-ordinate execution of at least one loader module operable to perform at least part of the loading operation, the co-ordinator module writing the or each loader module from the initial location of the loader module to a temporary location for execution, initiating execution of the module, and erasing the module from the temporary location after execution.

A plurality of loader modules are preferably provided to perform respective parts of the loading operation. The co-ordinator module preferably writes the loader modules in sequence to a temporary location.

Preferably the co-ordinator module writes the or each loader module to a temporary location which is within a loader part of the allocated region, designated for loader operations.

The co-ordinator module preferably maintains within the loader part, except at the location of a loader module which is being executed, data which has no functionality in relation to the loading operation. The co-ordinator module may decrypt an encrypted version of the loader module while writing the module to a temporary location.

The co-ordinator module preferably selects an address for the temporary location at the time of writing. Selection of the address is preferably pseudo-random.

In this aspect, the invention also provides a computer system operable to load a computer program in accordance with the method of this aspect of the invention.

Examples of the present invention will now be described in more detail, by way of example only, and with reference to the accompanying drawings, in which.

Figure 1:
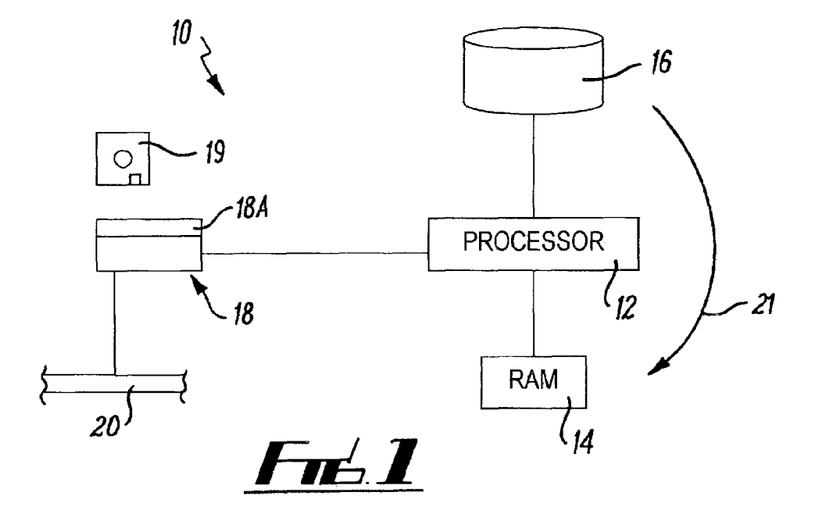
FIG. 1 is a simplified block diagram of a computer system with which the present invention may be used.

FIG. 1 illustrates a simplified block diagram of a computer system 10 which includes a processor 12 connected to main (RAM) memory 14, external memory 16 (such as a hard disc or other bulk storage device) and appropriate input and output devices indicated generally at 18. These may include a disc drive 18*a* for reading data from a floppy disc or other data carrier 19, or a connection to a network, such as a local area network (LAN) 20 or the internet.

The computer system 10 is a multi-purpose computer system able to perform a variety of tasks under software control. The system 10 may be of the type known as an IBM compatible personal computer (PC), but the invention can be implemented with other types of computer. Application software (such as word processing software) for controlling the system 10 is conventionally stored in the external memory 16 when not required. When the application is first called, the application must be installed by loading from the external memory 16 to the RAM 14, as indicated by the arrow 21.

The loading operation 21 is conventionally executed under the control of a "loader" program which will incorporate security checks etc., as noted above.

Figure 2:
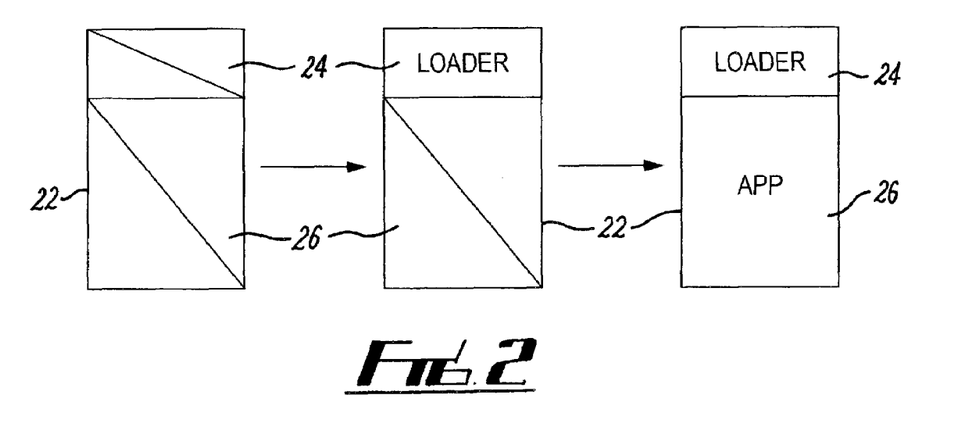
FIG. 2 illustrates in schematic form the contents of the main memory of the system of FIG. 1, during conventional loading of application software.

FIG. 2 illustrates schematically the contents of the relevant part of the RAM 14 during the loading process. A region 22 is allocated to the application and is divided into a loader part 24 at the beginning of the region 22 and a program part 26, following the loader part 24. It is to be understood that relative terms such as "before", "after" etc. are used to refer to the addresses within the RAM 14 and to the order in which they will be read during execution of the software.

Initially, the region 22 is empty, as indicated by diagonal lines drawn through the loader part 24 and program part 26.

As a first stage of the loading process 21, the operating system of the processor 12 will install, at 24, a loader program associated with the application. Control is then passed to the loader at 24. Execution of the loader will include security checks, initialising etc., following which the application will be read from the external memory 16 and installed in the program part 26. Operation of the loader is then complete and control passes to the application. The application is then ready for use.

It is during this operation of loading that the technique of "riding the loader" can be used to circumvent security being executed by the loader, in the manner described above.

A loading operation according to the present invention, to be carried out on a computer system such as the system 10 of FIG. 1, can now be described in more detail, and with reference to FIGS. 3*a*, 3*b*, 3*c*, 4 and 5.

Figure 3A:
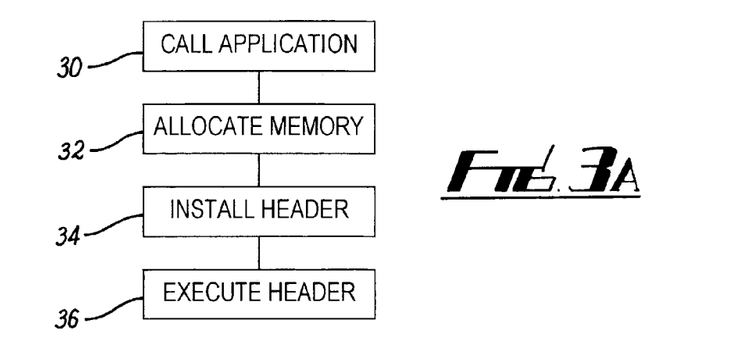
FIGS. 3*a*, 3*b* and 3*c* form a simplified flow diagram of the operation of the software loading arrangement for the present invention.

FIG. 3*a* illustrates the initial sequence of steps which takes place when an application is called at 30. The operating system allocates memory at 32 for the application (in accordance with the conventional step described above). Whereas conventionally, the operating system would then install a loader associated with the application, the arrangement of the invention will install an associated header, the function of which will be described below, in place of a conventional loader. The header is a program which will be incorporated within the application in the external memory 16 in the manner in which the operating system would expect to find a loader and consequently, the header is installed at 34 and then control is passed to it at 36. This changes the condition of the RAM 14 to the condition shown in FIG. 4a, with the allocated region of memory 38 empty, except for the header at 40. In this example, the header program is shown at the beginning of the region 38, and is called a "header" on this account. However, it is to be understood that the program could be located at another location, if that location is determined, so that the program can be executed as required.

Figure 3B:
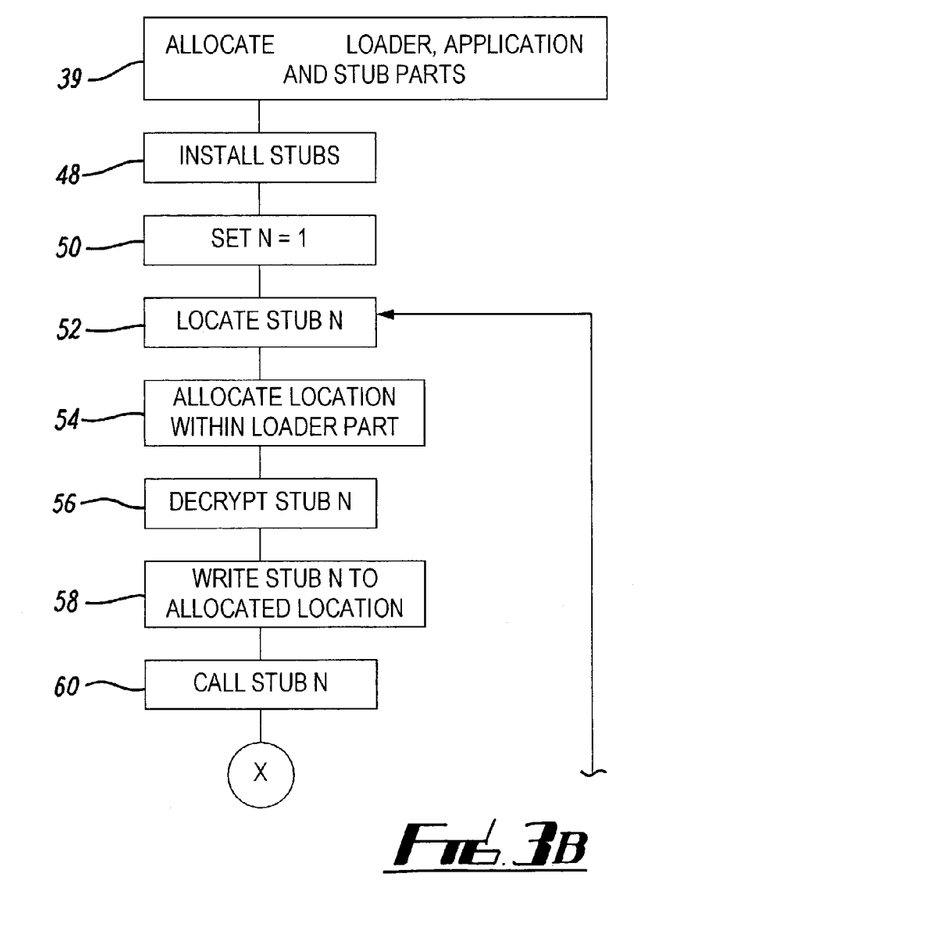
Figure 3C:
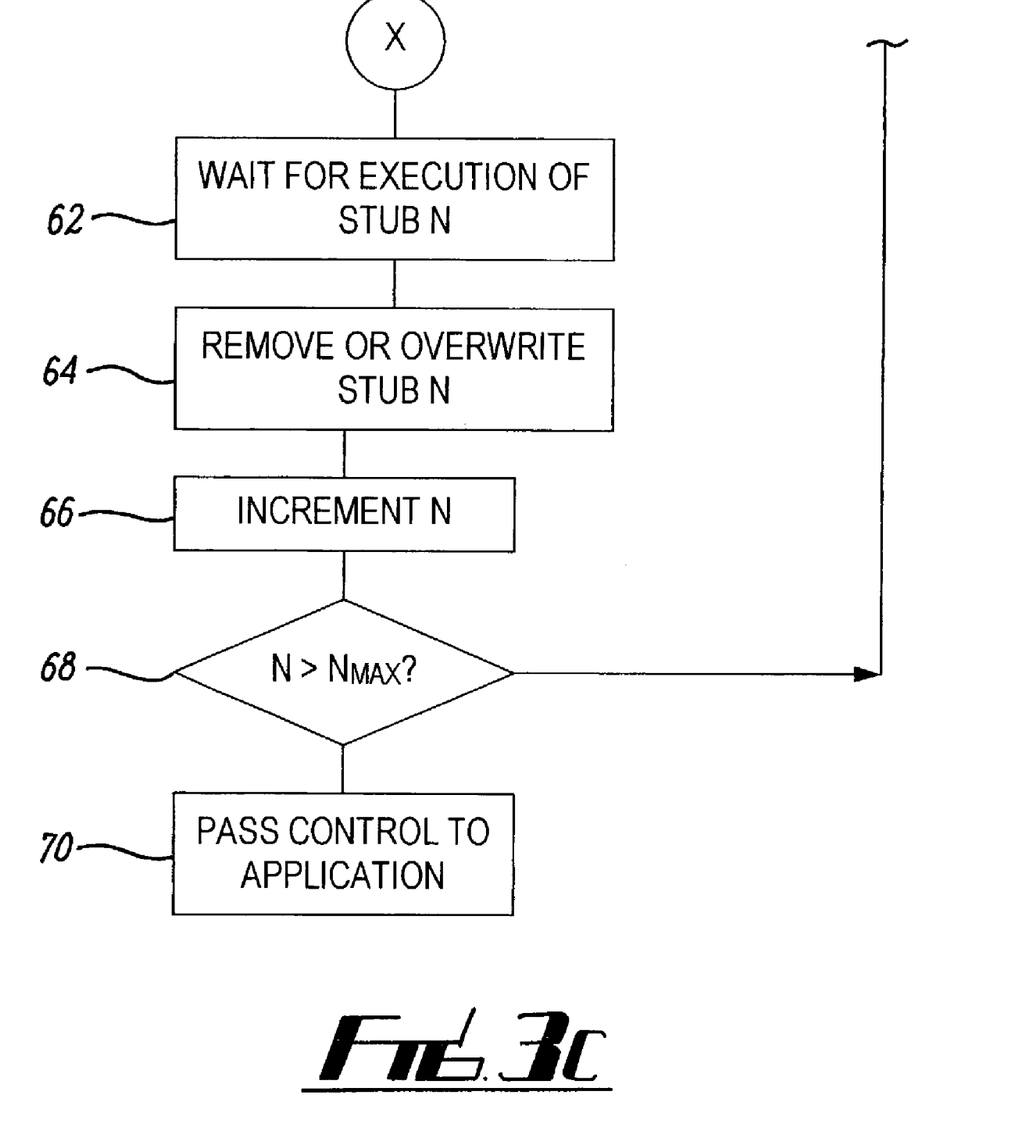

FIGS. 3b and 3c form a flow diagram of execution of the header. The symbol X is used to indicate how the two parts of the flow diagram connect to form the complete process. Initially, at 39, the header divides the allocated region 38 to allocate parts as a loader part 42, immediately following the header 40, an application part 44 and a stub part 46.

Stub modules to be described, are then installed at 48 in the stub part 46. In this example, five stub modules are installed, labelled STUB 1, STUB 2, etc. but it will become readily apparent that another number of stubs could alternativtely be used. The region 38 is then in the condition illustrated in FIG. 4b.

The header 40 then co-ordinates the use of the stub modules, sequentially, as follows. A count is initiated at 50 and the appropriate stub is located at 52. At step 54, the header allocates a location within the loader part 42 for the stub. This allocation may follow an algorithm, or be random or pseudo-random.

Following an optional decryption step 56, the stub is then written at 58 to the location allocated at step 54. The RAM is now in a condition shown in FIG. 4c, with the loader part 42 empty except for the area occupied by the stub, and with the application part 44 still empty.

The header 40 calls the stub at step 60 and then waits at 62 (FIG. 3c) for the completion of execution of the stub. When executed, the stub module will perform at least part of the operation of loading the application into the application part 44. This may be any part of the loading operation, including the writing of data into the application part 44, conducting security checks, initialising data or registers or the like. Examples will be given below as to the manner in which the loading operation can conveniently be divided.

Figures 4A, 4B:
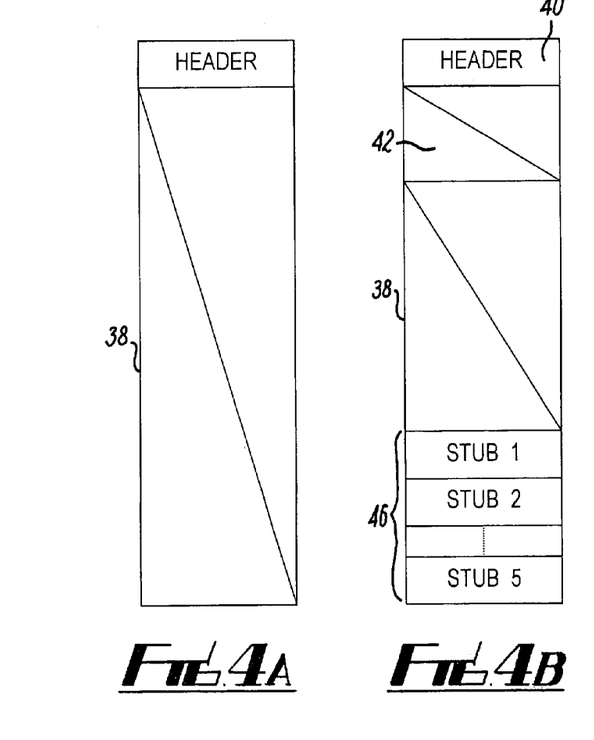
FIGS. 4*a* to 4*e* illustrates the state of the main memory during a loading operation in accordance with the present invention.
Figure 4C:
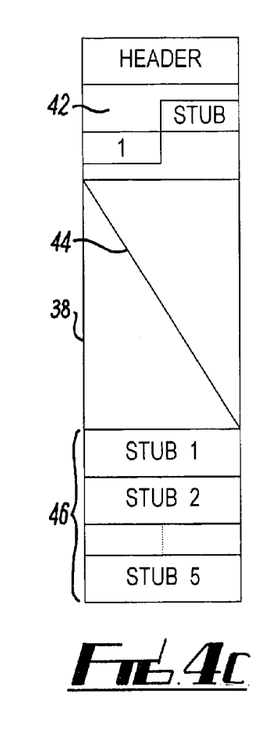
Figure 4D:
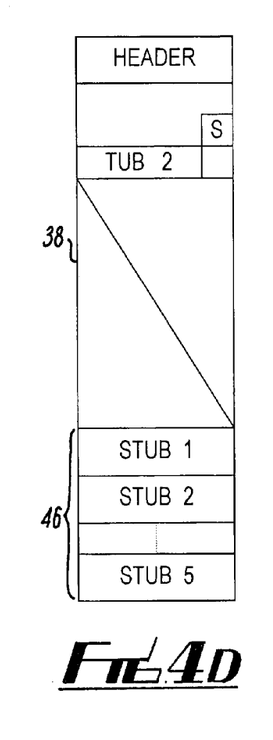
Figure 4E:
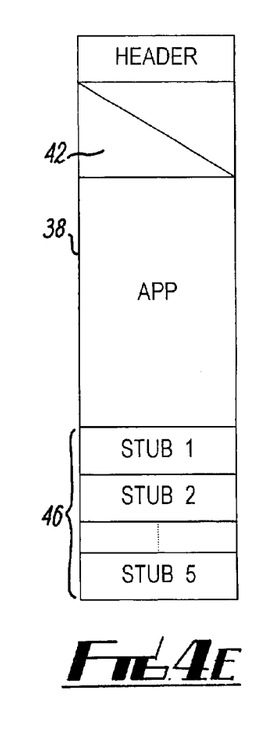

Once the stub module has successfully executed, the header removes the stub at 64 leaving the corresponding areas of RAM empty, or corrupts the data or overwrites the area with data which is meaningless in relation to the loading operations, i.e. has no functionality in that respect. Removal, corruption and overwriting are referred to, herein, as "erasing" for simplicity. This returns the RAM 14 to the state shown in FIG. 4b unless the stub has written data into the application part 44, and except that some of the region 22 may contain meaningless data rather than being empty as shown in FIG. 4b.

The value of N is then incremented at 66 and a decision is made at 68 to determine if further stub modules remain to be executed. This is achieved by comparing the incremented value of N with $N_{max}$, set at the total number of stub modules, repeatedly returning to step 52 until N exceeds $N_{max}$.

Consequently, during the second execution of the loop, the stub module STUB 2 is written into the loader part 42 (FIG. 4d) and executed. This cycle continues until all of the stub modules have been executed. The RAM 14 will then be in the condition of FIG. 4e, with the loader part 42 empty, the application installed in the application part 44 and the stub modules remaining in their original positions.

Control is then passed at 70 to the application which is then able to function in the normal manner.

Operation of the software loader arrangement described above provides security against "riding the loader", as follows. First, the stub modules appear in the loader part 42 only transiently. During most of the loading operation, most of the loader part 42 is empty, or preferably contains data which is meaningless (i.e. non-functional in relation to loading) data. Meaningless data is preferred to leaving the loader part 42 empty, because meaningless data may help to confuse a loader riding program. Secondly, the stub modules, when they do appear in the loader part 42, may occupy a different location on each occasion (according to the location allocated randomly or pseudo-randomly at step 54 (FIG. 3b)). Consequently, a loader riding program which looks for a security instruction at a particular address (i.e. an address fixed relative to the start of the allocated region 38, or an absolute address) is unlikely to find the target instruction at that location. A simple loader riding program can be expected to fail to circumvent security on most occasions on which the application is called and is thus unlikely to be generic either to that copy of the application on each occasion, or to other copies of the same application.

The success of a loader riding program might be improved if it was possible to determine in advance the location which would be allocated to a particular stub module. Although unlikely in practice, this might in theory be achieved by analysing the algorithm within the header 40, by which stub modules are allocated locations within the loader part 24. Conventional techniques, such as encryption, can be used to protect the header 40 from attack in this manner, but the invention envisages further protection in the following form, effective even if the location allocation algorithm has been analysed.

Figure 5:
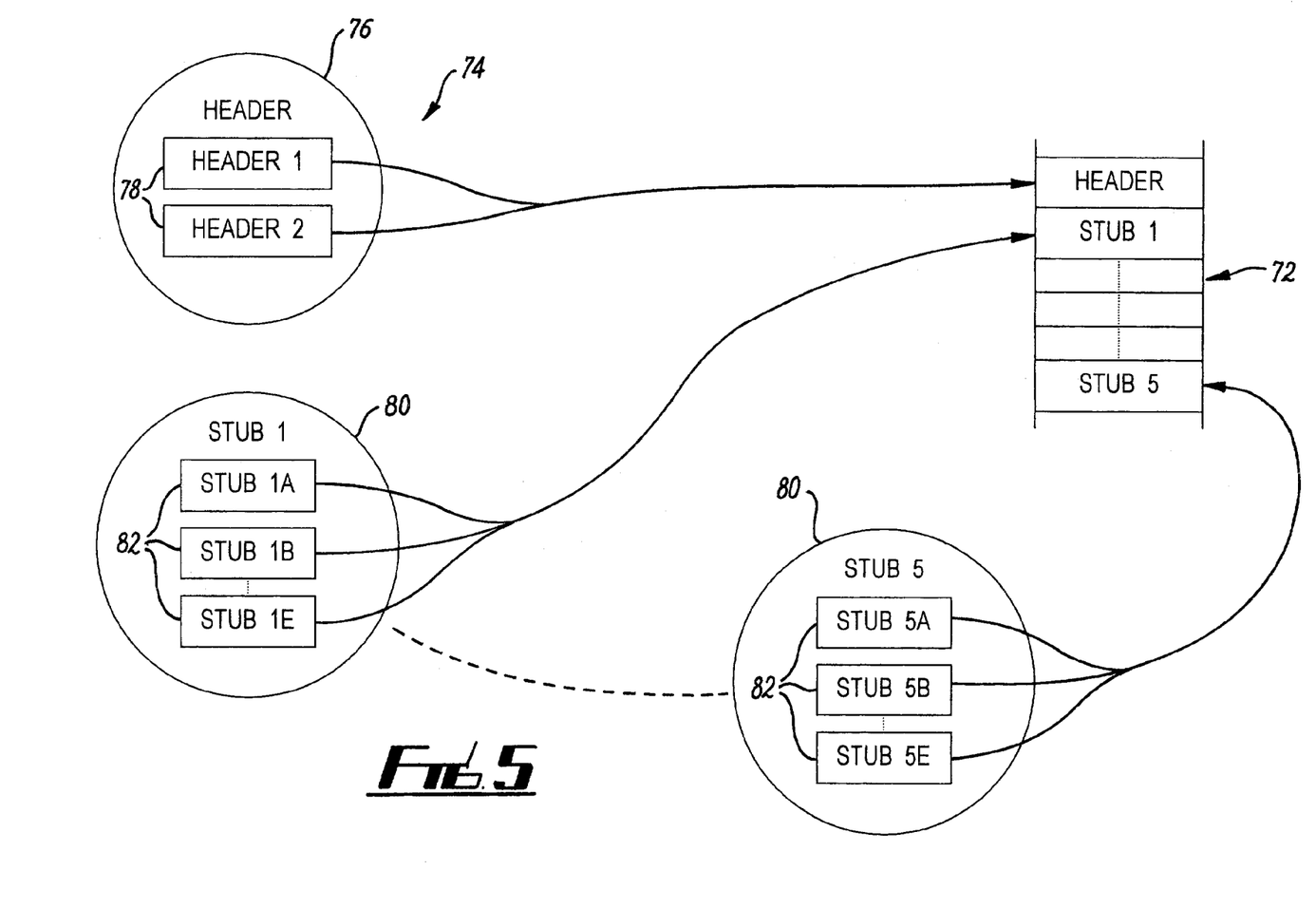
FIG. 5 schematically illustrates the formation of the software loading arrangement according to the present invention.

The software loader arrangement which has been described, consists of a header and five stub modules. The software loader arrangement can therefore be illustrated as a block of software containing these components, as illustrated at the right of FIG. 5. It is particularly to be noted that this is wholly schematic in suggesting that the header and stub modules will be contained consecutively in memory. It is apparent from the description above (particularly FIG. 4) that during use, particularly within the RAM 14, the header and stub modules will not be consecutively held.

The header and stub modules form an arrangement labelled 72 in FIG. 5. The arrangement 72 will be associated with a copy of the application in the external memory 16, as has been described. However, the arrangement 72 will not be identical for each authorised copy of the application software. The effect of each arrangement 72 will, however, be the same in each case and as described above. This is achieved as follows.

The arrangement 72, illustrated in FIG. 5, is formed by selection from a library 74 of software, illustrated toward the left of FIG. 5. This library includes a group 76 of header modules 78, labelled HEADER 1 and HEADER 2. The modules 78 are written differently. That is, the sequences of instructions within the modules 78 do not correspond throughout the modules 78. However, the effect of each of the modules 78, when executed, is identical.

This may be achieved by rewriting some of the functions performed by the modules 78, changing the order of instructions within the sequence, or the like. Alternatively, each header 78 could incorporate a different algorithm for generating pseudo-random allocations for stub modules within the loader part 42.

Similarly, the library 74 includes five stub groups 80 (labelled STUB 1 to STUB 5), each containing, in this example, five alternative stub modules 82 labelled STUB 1A to STUB 1E in the first stub group 80. Again, as described in relation to the header modules 78, the stubs within each group are interchangeable to the extent that each, upon execution, will achieve precisely the same results as each other stub module within the same group 80, but the sequences of instructions within each stub module of the same group 80 are not identical in that they differ in their order or in the manner in which they have been written.

The other 5 stub groups 80 also each contain 5 interchangeable stub modules.

The library 74 can be utilised in the following manner. When a copy of application software is to be protected, an arrangement 72 is formed by selecting one block of software from each of the groups 76, 80, to form the arrangement 72. This results in an arrangement 72 which will operate in the manner described above in relation to FIGS. 3a, 3b, 3c and 4. However, the library 74 provides, in this example, 6250 (5×5×5×5×5×2) different combinations of header and stub modules. Consequently, when a loader riding program is seeking to circumvent the protection provided by an arrangement 72, any generic loader riding program which assumes in any respect that the loading arrangement will be the same on each occasion, or for each copy of the application, will be flawed and unable to operate. It can be readily understood that by increasing the number of groups in the library 74, and by increasing the number of modules within each group, the total number of possibilities can be increased without any effective limit. It is expected that this would require a successful loader riding program to be so sophisticated as to amount to a program which solves a fresh problem on each occasion, i.e. is not generic in any way. The degree of sophistication thus required is expected to make the operation of riding the loader sufficiently difficult to overcome, as to be unattractive to most of those who would seek to enable the use of unlicensed software.

The loading operation can be sub-divided in any convenient manner to form stub modules, following which, groups of stub modules forming the library can be written. For example, in addition to the primary process of loading the application into the application part 44, modules could deal with decryption, rebuilding or encrypting the IAT, checking for tampering or signs of unauthorised activity by checking cyclic redundancy check (CRC) signatures, or for the presence of debuggers.

A software loader arrangement of the type described above can be provided in various ways to a potential user, such as a software producer seeking to protect an application in accordance with the invention. For example, a loader arrangement formed as described above, particularly in relation to FIG. 5, can be recorded on a recording medium for delivery to a potential user, or may be sent by creating a signal carrying information representing the arrangement, the signal being propagated to the potential user by an appropriate medium, such as a computer network. Similarly, a program which includes a loader arrangement of the type described may be recorded on a recording medium for delivery to a customer, or may be sent over a network by creating a signal, as set out above.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A data storage medium containing computer software which, when executed by a computer system, is operable as a software loader arrangement for loading a computer program from external memory to an allocated region of main memory for execution, the arrangement having a plurality of software modules including a co-ordinator module and a plurality of loader modules, wherein, in use, the co-ordinator module is loaded at a predetermined position of the allocated region and executed, and the co-ordinator module is operable to:
 select in turn each of the loader modules;
 write a selected loader module from an initial location to a temporary location for execution;
 initiate execution of the selected loader module; and
 erase the selected loader module from the temporary location after execution,
 wherein execution of each loader module performs a respective part of the loading process such that the computer program is loaded from the external memory to the main memory upon execution of all of the loader modules.

2. The data storage medium of claim 1, wherein each of the plurality of loader modules is selected from a group of modules, the modules of each group including sequences of instructions which are different in each module and which achieve the same result when fully executed.

3. The data storage medium of claim 1, wherein a loader part of the allocated region is designated for loader operations, the temporary location of each selected loader module being within the said loader part.

4. The data storage medium of claim 3, wherein each loader module is initially located in the allocated region at a location outside the said loader part.

5. The data storage medium of claim 4 wherein a program part of the allocated region is designated for the computer program, each loader module being initially located in the allocated region after the program part.

6. The data storage medium of claim 3, wherein the co-ordinator module maintains meaningless data within the loader part, except at the location of a loader module which is being executed, the meaningless data being non-functional with respect to loading operations.

7. The data storage medium of claim 1, wherein each loader module is held initially in encrypted form, the co-ordinator module being operable to decrypt the selected loader module while writing the selected loader module to the temporary location.

8. The data storage medium of claim 1, wherein the co-ordinator module, in use, writes each selected loader module to an address which is selected at the time of writing.

9. The data storage medium of claim 8, wherein selection of the address is pseudo-random.

10. A computer system incorporating a data storage medium according to claim 1.

11. The data storage medium of claim 1, further containing the computer program to be loaded.

12. A computer system incorporating a data storage medium as defined in claim 11.

13. The data storage medium of claim 1, wherein the storage medium contains a suite of software modules comprising one or more co-ordinator modules and a plurality of loader modules, the loader modules forming groups of modules, the modules of each group including sequences of instructions which are different in each module and which achieve the same result when fully executed, whereby said software loader arrangement may be formed by selecting one of the co-ordinator modules and one loader module from each group of loader modules.

14. A computer system incorporating a data storage medium as defined in claim 13.

15. A method of loading a computer program from external memory to an allocated region of main memory for execution, in which a co-ordinator module is loaded at a predetermined position in the allocated region and is operable to co-ordinate execution of a plurality of loader modules, each loader module being operable to perform a respective part of the loading operation such that the computer program is loaded to the main memory upon execution of all of the loader modules, the co-ordinator module selecting in turn each of the loader modules, writing a selected loader module from an initial location to a temporary location for execution, initiating execution of the selected module, and erasing the selected module from the temporary location after execution.

16. The method of claim 15, wherein the co-ordinator module writes each selected loader module to a temporary location which is within a loader part of the allocated region, the loader part being designated for loader operations.

17. The method of claim 15, wherein the co-ordinator module maintains within the loader part, except at the location of a selected loader module which is being executed, data which has no functionality in relation to the loading operation.

18. The method of claim 15, wherein the co-ordinator module decrypts an encrypted version of the selected loader module while writing the selected loader module to the temporary location.

19. The method of claim 15, wherein the co-ordinator module selects an address for the temporary location at the time of writing.

20. The method of claim 19, wherein selection of the address is pseudo-random.

21. A method of protecting a computer program during loading of the program from external memory to an allocated region of main memory of a computer, for execution, in which a co-ordinator software module is loaded at a predetermined position in the allocated region and used to co-ordinate execution of a plurality of loader modules, each loader module being operable to perform a respective part of the loading operation such that the computer program is loaded to the main memory upon execution of all of the loader modules, the co-ordinator module selecting in turn each of the loader modules, writing a selected loader module from an initial location to a temporary location for execution, initiating execution of the selected loader module, and erasing the selected loader module from the temporary location after execution.

22. The method of claim 21, wherein the co-ordinator module writes each selected loader module to a temporary location which is within a loader part of the allocated region, designated for loader operations.

23. The method of claim 21, wherein the co-ordinator module maintains within the loader part, except at the location of the selected loader module which is being executed, data which has no functionality in relation to the loading operation.

24. The method of claim 21, wherein the co-ordinator module decrypts an encrypted version of the selected loader module while writing the selected loader module to the temporary location.

25. The method of claim 21, wherein the co-ordinator module selects an address for the temporary location at the time of writing.

26. The method of claim 25, wherein selection of the address is pseudo-random.

* * * * *